(12) United States Patent
Kim

(10) Patent No.: US 6,937,785 B2
(45) Date of Patent: Aug. 30, 2005

(54) OPTICAL COMMUNICATION SYSTEM USING 4 WAVELENGTH ADD/DROP TYPE WAVELENGTH DIVISION MULTIPLEXING

(75) Inventor: Tae-Kwon Kim, Kyoungki-do (KR)

(73) Assignee: A&P Telecom Co., Ltd. (KR)

( * ) Notice: Subject to any disclaimer, the term of this patent is extended or adjusted under 35 U.S.C. 154(b) by 185 days.

(21) Appl. No.: 10/468,748

(22) PCT Filed: Dec. 5, 2001

(86) PCT No.: PCT/KR01/02099

§ 371 (c)(1),
(2), (4) Date: Aug. 22, 2003

(87) PCT Pub. No.: WO02/067468

PCT Pub. Date: Aug. 29, 2002

(65) Prior Publication Data

US 2004/0071397 A1 Apr. 15, 2004

(30) Foreign Application Priority Data

Feb. 22, 2001 (KR) .................................. 2001-0008951

(51) Int. Cl.$^7$ ................................................ G02B 6/28
(52) U.S. Cl. ............................. 385/24; 398/68; 398/69; 359/123
(58) Field of Search .......................... 385/24; 359/123, 359/179; 398/43, 68, 69

(56) References Cited

U.S. PATENT DOCUMENTS

| | | | |
|---|---|---|---|
| 5,446,572 A | 8/1995 | Husbands et al. | 359/133 |
| 5,448,390 A | 9/1995 | Tsuchiya et al. | 359/132 |
| 5,717,795 A * | 2/1998 | Sharma et al. | 385/24 |
| 6,404,940 B1 * | 6/2002 | Tsuyama et al. | 385/17 |
| 6,429,974 B1 * | 8/2002 | Thomas et al. | 359/618 |
| 6,631,018 B1 * | 10/2003 | Milton et al. | 398/59 |
| 6,782,200 B1 * | 8/2004 | Warbrick et al. | 398/51 |
| 2003/0185511 A1 * | 10/2003 | Kirkby et al. | 385/37 |

FOREIGN PATENT DOCUMENTS

| | | |
|---|---|---|
| KR | 2001-78458 A | 8/2001 |
| KR | 2001-78460 A | 8/2001 |

OTHER PUBLICATIONS

PCT International Preliminary Examination Report; International application No. PCT/KR01/02099; International filling date of Dec. 5, 2001; Date of Completion Feb. 13, 2003.

International Search Report; International application No. PCT/KR01/02099; International filing date of Dec. 5, 2001; Mailing date of Mar. 18, 2002.

* cited by examiner

*Primary Examiner*—Ellen E. Kim
(74) *Attorney, Agent, or Firm*—Cantor Colburn LLP

(57) ABSTRACT

An optical communication system using a four-wavelength add/drop type wavelength division multiplexer (WDM) is provided for extending a communication coverage without adding an optical line and a repeater by installing a wavelength-pass add/drop type optical module at an optical line connected between an existing transmitting station or base station and an existing receiving station or repeater. The optical communication system includes a slave unit including, a first WDM for dividing or mixing a first wavelength and a second wavelength, a second WDM which is connected to the first WDM and divides or mixes the first wavelength and the second wavelength to allow them travel through a predetermined path, a third WDM which is connected to the first WDM and divides a third wavelength and a fourth wavelength from a communication line of the second wavelength; and a fourth WDM which is connected to the second WDM and multiplexes or demultiplexes the third wavelength and the fourth wavelength. Accordingly, by installing slave units at an optical line connected to an existing base station and an existing master unit, the base station can communicate with the master unit without distortion or loss of a signal and the slave units can communicate with each other.

7 Claims, 4 Drawing Sheets

OPTICAL COMMUNICATION SYSTEM USING 4 WAVELENGTH ADD/DROP TYPE WAVELENGTH DIVISION MULTIPLEXING

TECHNICAL FIELD

The present invention relates to an optical communication system using a four-wavelength add/drop type wavelength division multiplexer, and more particularly, to an optical communication system for extending a communication coverage without adding an optical line and a repeater by installing a wavelength-pass add/drop type optical module at an optical line connected between an existing transmitting station or base station and an existing receiving station or repeater.

BACKGROUND ART

Recently, with development of mobile communication service, high-quality service for non-service areas from secluded places among the mountains and remote islands which are not covered by mobile communication service to basements and apartment areas which are left as poor propagation areas in downtowns is required. However, to fulfill the requirement, it is necessary to build base stations in areas where telephone traffic is low at enormous expense, which is not profitable for mobile communication service companies due to inefficiency of investment and causes waste of national resources. Accordingly, a method for securing coverage and increasing communication quality in different concept than an existing mobile communication system is desired. In advanced nations, a repeater system using a CATV network is positively considered. When the geographical features of Korea having more than 80% of the land occupied by mountains and hills are considered, there is much limitation in using a microwave or a laser repeater system needing to secure the line-of-sight between a base station and a repeater station.

FIG. 1 is a schematic diagram of the configuration of a conventional optical communication system. The conventional optical communication system 100 includes a base station 110 and a repeater 120. The repeater 120 includes a master unit 125 and slave units 125a through 125d. Although only one master unit 125 is shown in FIG. 1, three master units 125 can be connected to the base station 110, and the four slave units 125a through 125d can be connected to each of the master units 125.

The base station 110 serves as a bridge connecting an exchange (not shown) to mobile terminals. The base station 110 is connected to the exchange through a cable network and connected to mobile terminals through a wireless network. The base station 110 includes an antenna for connecting these cable and wireless networks, a transmitter, a receiver, and a power supply unit and has a matching function for connecting the exchange to mobile terminals.

The master unit 125 of the repeater 120 is connected to the base station 110. The slave units 125a through 125d are linked to the master unit 125 through optical cables. Here, a wavelength of 1310 nm is used for optical transmission from the base station 110 to the master unit 125, and a wavelength of 1550 nm is used for optical transmission from the master unit 125 to the base station 110. Such optical communication system 100 transmits and receives electric waves through an optical cable, thereby achieving excellent quality of communication with minimum propagation loss. When it is considered that the service radius of the base station 110 is within about 1.5 km in the downtown area and is within about 5 km in the suburban area, the optical communication system 100 can provide a service over a wide area since a maximum of 12 slave units per base station 110 can be installed within the radius of 20 km.

Such optical communication system 100 necessarily requires a multiplexing apparatus for distributing a signal from a single point to many points or converging signals input from many points on a single point in a subscriber network such as CATV or Fiber In To Loop (FITL) developed with accomplishment of high-technology information communication network. Such a multiplexing apparatus is not that simple it is in an existing communication cable network. It can be realized as a special apparatus, i.e., an optical coupler. Optical couplers from a very simple 1H2 type which divides a signal received through a single channel into two signals to a complex 32H32 type which receives signals through 32 channels and distributes the signals through 32 channels have been commercialized. In the early stage of optical communication, instead of using optical couplers, optical fiber and optical cable channels are increased, thereby complicating communication networks. Use of optical couplers accomplishes simple communication networks. There are different types of couplers such as star couplers, directional couplers, and tree couplers according to the configuration of an information communication network.

Additionally, wavelength division multiplexer (WDM) is used as a special coupler and divide a wavelength of light. For example, a WDM divides a wavelength of 1310 nm from a wavelength of 1550 nm, inserts two different signals at the two different wavelengths, and transmits the two different signals through a single channel, i.e., an optical fiber cable. In addition, the WDM receives a mixed signal and divides it into two signals. Mechanisms of WDM include a grating method using the principle that refraction and reflection vary with wavelengths and a dichroic coating method using the principle that a particular wavelength is transmitted through a filter but all other wavelengths are reflected from the filter.

However, conventional optical communication systems have the following problems. First, since a network is established in a 1:1, 1:2, or 1:3 mode depending on installation and extensivity of master units and slave units, the supply of repeaters is in saturation, and additional optical cables must be installed to additionally establish slave units. In this case, additional installation of optical cables needs additional expenses, increasing financial burden on communication service companies. Second, since slave units are not controlled by a base station but are controlled by a master unit, communication between slave units is restricted. Communication between slave units can be accomplished, but it is needed to provide additional equipment for slave units. Third, in a multiplexing method using optical couplers, it is difficult to change wavelengths, and big and small loss according to a divergence ratio occurs during transmission. Since a fixed particular wavelength is used to distribute a desired wavelength or mix desired wavelengths using an optical coupler, it is difficult to adapt a conventional optical communication system to a flexible environment.

DISCLOSURE OF THE INVENTION

Accordingly, to solve the above problems, it is an object of the present invention to provide an optical communication system using a four-wavelength add/drop type wavelength division multiplexer, through which a low-cost optical communication service can be provided without increasing optical cables by installing a slave unit composed of a wavelength-pass add/drop type four-wavelength optical module in an optical communication system using existing 1:1 mode wavelength division multiplexing using wavelengths of 1310 nm and 1550 nm.

To achieve the object of the present invention, there is provided a an optical communication system for providing a high quality mobile communication service over areas where propagation is not well accomplished and extending a communication coverage by connecting a base station to a master unit using a four-wavelength add/drop type wavelength division multiplexer (WDM). The optical communication system includes a slave unit including a first WDM for dividing or mixing a first wavelength and a second wavelength, a second WDM which is connected to the first WDM and divides or mixes the first wavelength and the second wavelength to allow them travel through a predetermined path, a third WDM which is connected to the first WDM and divides a third wavelength and a fourth wavelength from a communication line of the second wavelength, and a fourth WDM which is connected to the second WDM and multiplexes or demultiplexes the third wavelength and the fourth wavelength.

According to the present invention, slave units are connected between a base station and a master unit so that the slave units can communicate with each other. The slave units are installed at an existing optical line without additionally installing an optical line, thereby extending a communication coverage at low cost and realizing reliable communication. In other words, the present invention allows an existing base station to communicate with an existing master unit as in conventional systems and allows slave units to independently communicate with each other. In addition, a fiber type or micro-lens type filter is used for each line to adjust an isolation ratio to about 60 dB, thereby accomplishing wavelength blocking to prevent interference between adjacent wavelengths. The isolation ratio can be freely changed within a range from 25 dB to 60 dB when necessary.

BEST MODE FOR CARRYING OUT THE INVENTION

Hereinafter, a preferred embodiment of an optical communication system using a four-wavelength add/drop type wavelength division multiplexer according to the present invention will be described with reference to the attached drawings.

Figure 1:
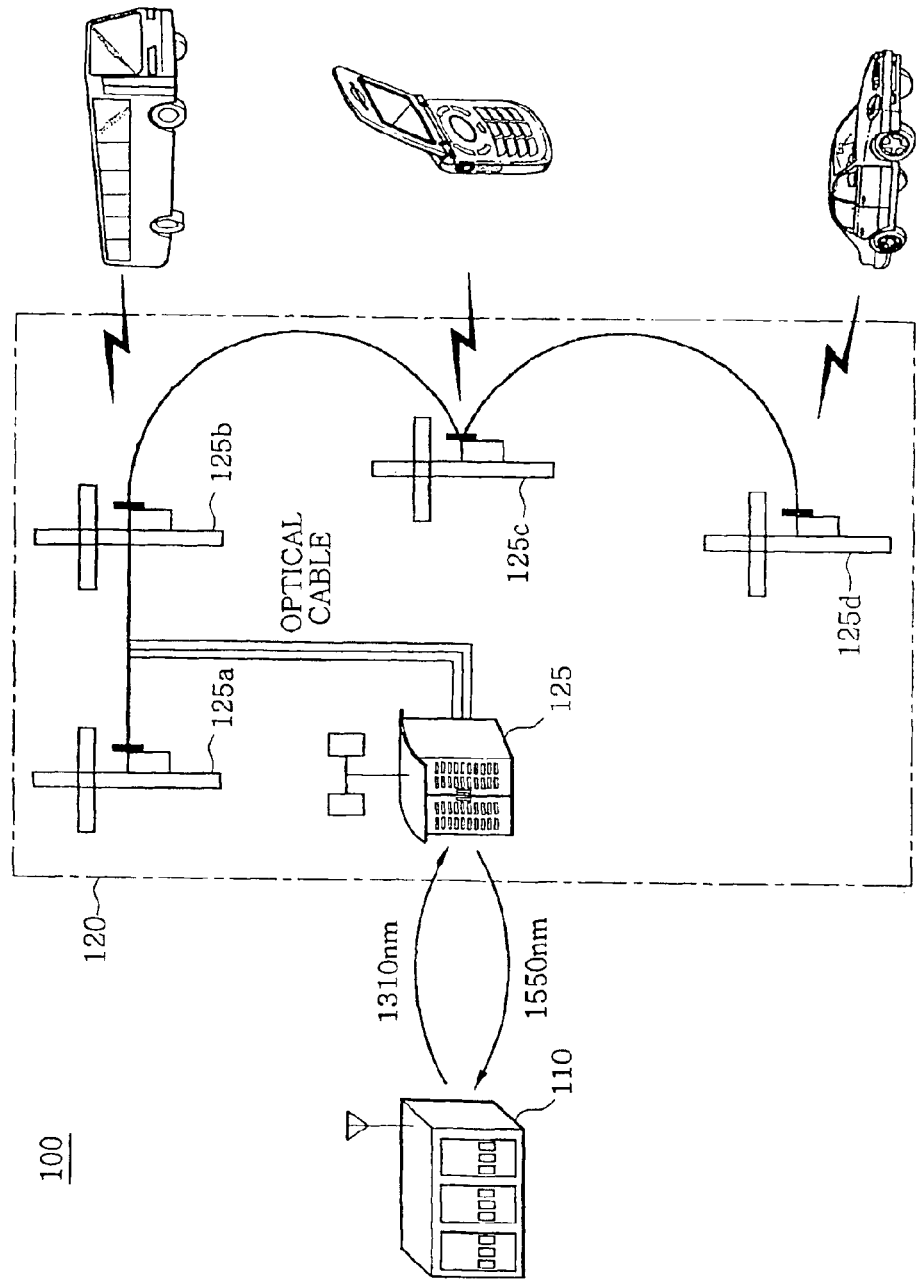
FIG. 1 is a schematic diagram of the configuration of a conventional optical communication system.
Figure 2:
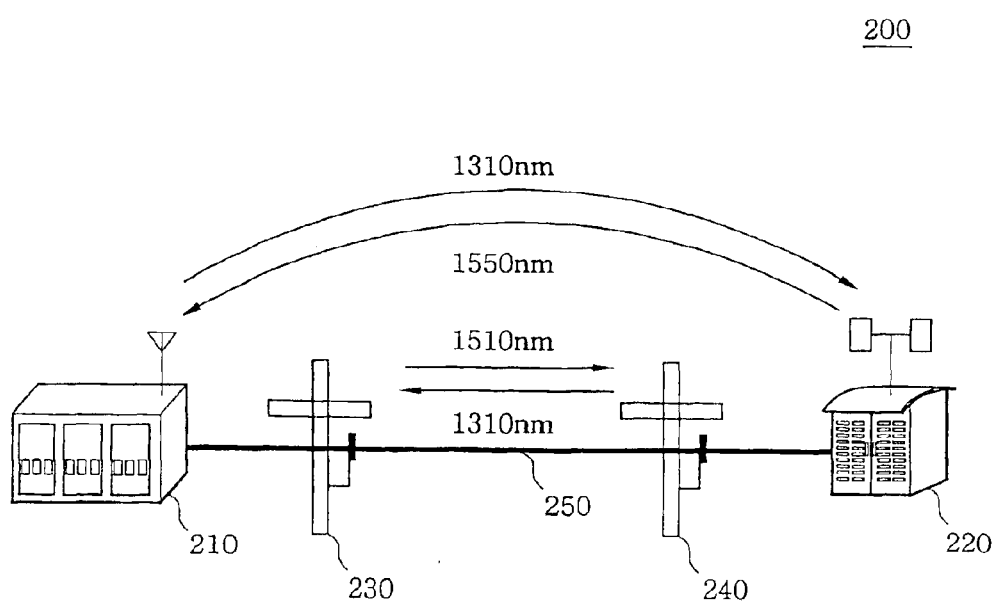
FIG. 2 is a schematic diagram of the configuration of an optical communication system according to the present invention.

FIG. 2 is a schematic diagram of an optical communication system 200 according to the present invention. The optical communication system 200 includes a base station 210, a master unit 220, and slave units 230 and 240. The members of the optical communication system 200 are connected through an optical cable 250. Although only two slave units 230 and 240 are shown in FIG. 2, it will be apparently understood by those skilled in the art that more slave units can be connected according to an environment to which the present invention is applied.

The base station 210 serves as a bridge connecting an exchange (not shown) to mobile terminals. The base station 210 is connected to the exchange through a wire network and connected to mobile terminals through a wireless network. The base station 210 includes an antenna for connecting these wire and wireless networks, a transmitter, a receiver, and a power supply unit and has a matching function for connecting the exchange to mobile terminals. The members of the base station 210 are obvious to those skilled in the art of the present invention, and thus descriptions thereof will not be described in detail.

A repeater is a means for minimizing transmission failure occurring when a signal of a receiving band is transmitted and for covering shades or dead zones such as buildings, department stores, shopping centers, basement parking lots, subways, and tunnels where a signal of the base station 210 cannot steadily secure a coverage. The repeater is used for providing a service as good as in a general base station within shades by amplifying a bidirectional signal. The repeater includes the master unit 220 and the slave units 230 and 240. The master unit 220 of the repeater is connected to the base station 210. The slave units 230 and 240 are linked between the base station 210 and the master unit 220 through the optical cable 250. The repeater is used for covering shades or dead zones within a service area and for extending a service radius.

The base station 210 communicates with the master unit 220 according to a conventional method. In other words, a wavelength of 1310 nm is used for transmission from the base station 210 to the master unit 220, and a wavelength of 1550 nm is used for transmission from the master unit 220 to the base station 210. In addition, a wavelength of 1510 nm is used for transmission from the first slave unit 230 to the second slave unit 240, and a wavelength of 1310 nm is used for transmission from the second slave unit 240 to the first slave unit 230. However, a transmission wavelength can be changed to, for example, 1480 nm or 1570 nm when necessary. That is, any wavelength within a range from 1400 nm to 1700 nm can be used for communication between the first and second slave units 230 and 240. The first slave unit 230 is directly connected to the base station through the optical cable 250. The second slave unit 240 is connected to the first slave unit 230 and to the master unit 220 through the optical cable 250.

Figure 3:
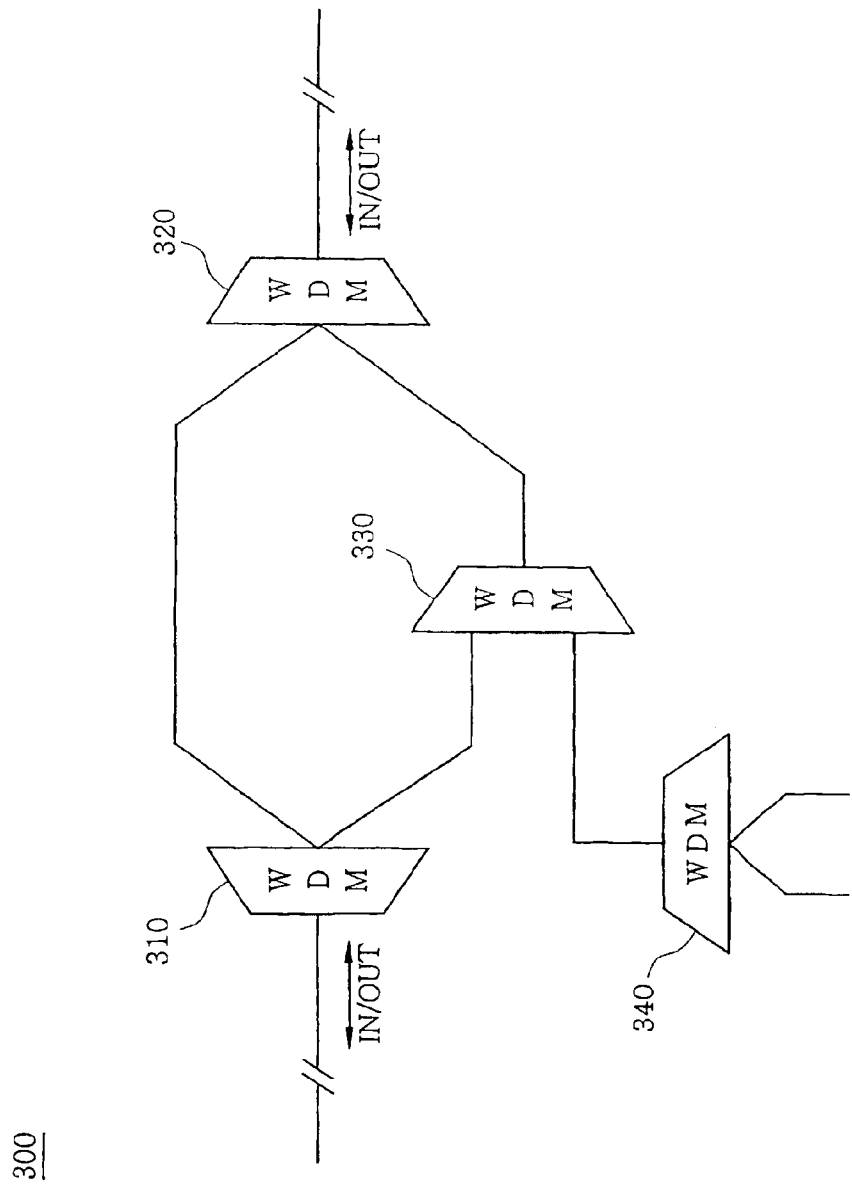
FIG. 3 is a diagram of the internal configuration of a slave unit shown in FIG. 2.

FIG. 3 shows the internal configuration of a slave unit according to the present invention. The slave unit 300 is composed of four wavelength division multiplexers (WDMs) 310, 320, 330, and 340. The first and second slave units 230 and 240 have the same configuration with the exception that the third WDMs in the first and second slave units 230 and 240 operate in opposite directions. Thus, a description will be made for the one slave unit 300.

The first WDM 310 is realized as an optical fiber type WDM or micro-lens filter WDM and serves to divide and mix particular wavelengths of, for example, 1310 nm and 1550 nm. A WDM has a function of adding a signal to be transmitted or dropping a signal to be received at a node. An optical communication method using a WDM in which upward and downward signals are allocated different wavelengths for transmission through optical fiber is similar to a frequency division multiplexing method for electric signals. In such optical communication method using a WDM, WDM circuits are installed at both ends of an optical cable, and upward and downward signals are divided and separately extracted based on a difference in a wavelength, so that interference between the upward and downward signals rarely occurs during communication even if they are reflected from the optical cable during transmission. For example, a wavelength of 1310 nm is divided from a wavelength of 1550 nm and two different signals are inserted at the two different wavelengths and transmitted through a single channel, that is, an optical cable. In addition, a mixed signal is received and divided into two signals using a WDM. Moreover, a signal can be simultaneously transmitted in two opposite directions through a single optical cable using a bidirectional coupler.

In order to steadily realize optical communication using a WDM, an optical amplifier having large and flat gain, a laser maintaining an accurate wavelength, a multiplexer mixing different wavelengths, a demultiplexer dividing a mixed wavelength into different wavelengths, and an optical filter having small interference are required. In addition, a modulation technique for long distance transmission and a dispersion compensation technique for increasing the speed of a single channel are required.

A function of amplifying a weak signal without photoelectric conversion to restore an original signal is essential to ultrahigh-speed optical communication. For this function, an erbium doped fiber amplifier (EDFA) is usually used. The important parameters of the EDFA are gain flatness and power. In the case where there is a difference in gain depending on wavelengths, if amplification is performed many times, a difference in power between channels increases, and the power of an amplifier is saturated in a large signal, so the signal of another channel becomes weak. Accordingly, it is preferable to select a channel to be multiplexed at flat gain of an amplifier for communication.

In addition, in order to maintain wavelength intervals among channels constant, a laser diode (LD) operating at a desired wavelength and a technique of monitoring the wavelength of each LD and controlling the wavelength not to change are required. For this, it is preferable to use an LD, for example, a multiquantumwell DFB LD, which allows at least 40 channels to be selected at intervals of 0.8 nm. Moreover, methods of determining the current wavelength position of an LD by detecting the strength of transmitted light using an interferometer which transmits wavelengths only at predetermined intervals are used.

Among methods of optically multiplexing the wavelengths of different channels modulated at a transmitting terminal into one or demultiplexing different transmitting channels by wavelengths, a method of realizing an arrayed waveguide grating (AWG) as a power line communication (PLC) circuit is widely used because it is cheaper than other methods as the number of channels increases and allows mass production once specifications are fixed. Accordingly, the method is very useful when division/mixing is performed at a middle node or when the number of channels to be divided or mixed increases. Meanwhile, when the number of times of division or mixing is small, it is preferable to use a fiber grating which reflects only a particular wavelength. In optical communication near a wavelength of 1310 nm, optical loss is a prime cause of limitation in a transmission distance. In contrast, when an EDFA is used, the chirp and dispersion of an LD are prime causes of limitation in a transmission distance. A chirp is a phenomenon in which a wavelength instantaneously changes according to a change in input current when an LD is directly modulated, thereby distorting a pulse due to an increase in a wavelength width during transmission. Accordingly, instead of directly modulating an LD, light emitted from the LD is externally modulated in long distance transmission. In order to accomplish such external modulation, a Mach-Zehnder interferometer using $LiNbO_3$ is usually used.

The second WDM 320 is connected to the first WDM 310 and performs a function of dividing and mixing external wavelengths (for example, wavelengths applied from another slave unit). Here, no apparatus is connected between the first WDM 310 and the second WDM 320 in order to minimize communication loss. The second WDM 320 is realized as an optical fiber type or micro-lens filter WDM. The second WDM has a different connection than the first WDM but operates in the same manner as the first WDM 310.

The third WDM 330 is connected to the first WDM 310 and the fourth WDM 340 and performs a function of performing multiplexing or demultiplexing on a wavelength divided by the first WDM 310 and an external wavelength (for example, a wavelength applied from the fourth WDM 340). In other words, the third WDM 330 performs demultiplexing on a wavelength of, for example, 1550 nm divided by the first WDM 310 and wavelengths of, for example, 1510 nm and 1530 nm which are mixed by the fourth WDM 340 and outputs the result of demultiplexing to a predetermined path. The internal configuration and other functions of the third WDM 330 are the same as those of the first WDM 310.

The fourth WDM 340 is connected to the third WDM 330 and is realized as a 1510-nm/1530-nm micro-lens or optical fiber type WDM. The fourth WDM 340 performs a function of multiplexing or demultiplexing wavelengths of 1510 nm and 1530 nm through 1550-nm optical fiber. More specifically, the fourth WDM 340 is realized as a predetermined-spacing fiber biconical tapered (FBT) or band-pass filter WDM and divides a desired wavelength on a communication line of a particular wavelength. In addition, the fourth WDM 340 can selectively use a wavelength of, for example, 1480 nm or 1550 nm according to a communication environment. In other words, the fourth WDM 340 can use any wavelength within a range from 1400 nm to 1700 nm. The other functions of the fourth WDM 340 are the same as those of the first WDM 310. Here, a breaking function is added so that wavelengths of 1550 nm, 1530 nm, and 1510 nm do not leak in a 1310-nm line and a wavelength of 1310 nm does not leak in a 1550-nm line. In addition, an optical fiber type or micro-lens filter is used for each line to adjust an isolation ratio to about 60 dB. The isolation ratio can be freely changed within a range from 25 dB to 60 dB according to a communication environment.

Hereinafter, the operations of an optical communication system using a four-wavelength add/drop type WDM according to the present invention will be described in detail with reference to the attached drawings.

Figure 4:
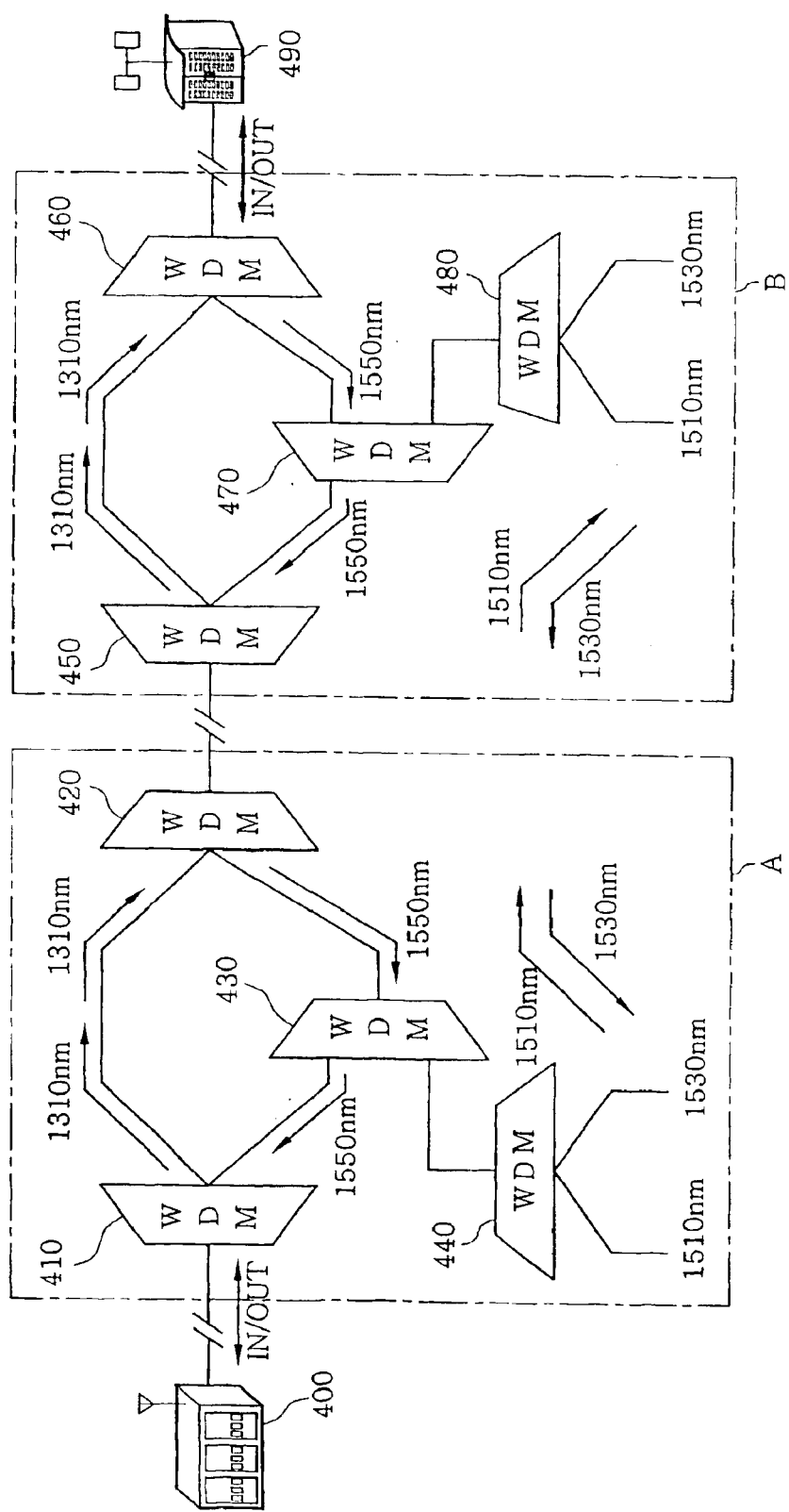
FIG. 4 is a diagram showing the connection between slave units and the flow of a wavelength according to the present invention.

FIG. 4 is a diagram showing the connection between slave units and the flow of a wavelength according to the present invention.

Before setting forth the operations of the present invention, an optical communication system in which two slave units A and B are connected between a base station 400 and a master unit 490 is build. Here, the slave unit A near to the base station 400 is referred to as a first slave unit, and the slave unit B near to the master unit 490 is referred to as a second slave unit. It is assumed that a wavelength of 1310 nm is transmitted from the base station 400 to the master unit 490, a wavelength of 1550 nm is transmitted from the master unit 490 to the base station, a wavelength of 1510 nm is transmitted from the first slave unit A to the second slave unit B, and a wavelength of 1530 nm is transmitted from the second slave unit B to the first slave unit A.

First, in the path of a wavelength from the base station 400 to the master unit 490, the wavelength needs to pass through the first and second slave units A and B for communication. The wavelength of 1310 nm output from the base station 400 is divided by a first WDM 410 and mixed again by a second WDM 420 in the first slave unit A, and then is applied to a first WDM 450 of the second slave unit B. Here, since no apparatus is connected between the first WDM 410 and the second WDM 420 in order to minimize communication loss, the first WDM 410 and the second WDM 420 simply serve to provide a communication path from the base station 400 to the master unit 490. The wavelength of 1310 nm applied to the second slave unit B is transmitted to the master unit 490 through the same path as in the first slave unit A.

Second, in the path of a wavelength from the master unit 490 to the base station 400, the wavelength of 1550 nm applied from the master unit 490 is divided by a second WDM 460 and is input to a third WDM 470 in the second slave unit B. Then, the wavelength of 1550 nm is demultiplexed by the third WDM 470 and is mixed by a first WDM 450 in the second slave unit B and is applied to the second WDM 420 of the first slave unit A. The wavelength of 1550 nm applied to the first slave unit A is transmitted to the base station 400 through the same path as in the second slave unit B.

Third, in the path of a wavelength from the first slave unit A to the second slave unit B, a wavelength of 1510 nm is used for transmission from the first slave unit A to the second slave unit B by dividing the wavelength of 1510 nm from a 1550-nm line using a 1510/1530-nm WDM of a 20-nm spacing FBT type. The wavelength of 1510 nm divided by a fourth WDM 440 of the first slave unit A is demultiplexed by a third WDM 430 and is applied to the first WDM 450 of the second slave unit B through the second WDM 420 of the first slave unit A. The wavelength of 1510 nm applied to the second slave unit B passes through the first and third WDMs 450 and 470 and is multiplexed by a fourth WDM 480 of the second slave unit B. The second slave unit B extracts the wavelength of 1510 nm multiplexed by the fourth WDM 480 and uses it for communication.

Fourth, in the path of a wavelength from the second slave unit B to the first slave unit A, a wavelength of 1530 nm is used for transmission from the second slave unit B to the first slave unit A and travels back through the path of a wavelength from the first slave unit A to the second slave unit B. As in the first slave unit A, a wavelength of 1530 nm is divided from a 1550-nm line using a 1510/1530-nm WDM of a 20-nm spacing FBT type. The wavelength of 1530 nm passes through the fourth WDM 480 and the third WDM 470 and is mixed by the first WDM 450 in the second slave unit B and is applied to the second WDM 420 of the first slave unit A. Then, the wavelength of 1530 nm is multiplexed by the third and fourth WDMs 430 and 440. Accordingly, the wavelength of 1530 nm is extracted and used for communication.

As described above, according to the present invention, communication between a base station and a master unit and communication between a first slave unit and a second slave unit can be accomplished by dividing and mixing four wavelengths using WDMs. Here, it is preferable to adjust an isolation ratio to about 25 through 60 dB using a fiber type filter in order to break a wavelength of 1310 nm not to be transmitted to a 1550-nm line and break wavelengths of 1550 nm, 1530 nm, and 1510 nm not to be transmitted to a 1310-nm line. Accordingly, the present invention allows independent communication through wavelengths of 1310 nm, 1510 nm, 1530 nm, and 1550 nm. An isolation ratio for wavelengths is set to at least −12 dB. An isolation ratio for channels is set to at least −25 dB. An isolation ratio for preventing interference between the wavelengths of 1310 nm and 1550 nm is set to at least −25 dB. Insertion loss of each wavelength is set to 3 dB or less. In addition, the bandwidth of a wavelength of 1310 nm is ∀10 nm, and the bandwidth of wavelengths of 1510 nm, 1530 nm, and 1550 nm is ∀7 nm.

The above-described invention is just an embodiment of the present invention. The present invention is not restricted to the above embodiment, and various modifications can be made thereto within the scope defined by the attached claims. For example, the shape and structure of each member specified in the embodiment can be changed.

INDUSTRIAL APPLICABILITY

As described above, in an optical communication system using a four-wavelength add/drop type WDM according to the present invention, slave units are installed at an optical line connected to an existing base station and an existing master unit so that the base station can communicate with the master unit without distortion or loss of a signal and the slave units can communicate with each other.

In addition, a wavelength-pass add/drop type optical module is installed at an optical line connected between an existing transmitting station or base station and an existing receiving station or repeater so that a communication coverage can be extended at low cost without additionally installing an optical line and a repeater.

What is claimed is:

1. An optical communication system for providing a high quality mobile communication service over areas where propagation is not well accomplished and extending a communication coverage by connecting a base station to a master unit using a four-wavelength add/drop type wavelength division multiplexer (WDM), the optical communication system comprising a slave unit comprising:
   a first WDM for dividing or mixing a first wavelength and a second wavelength;
   a second WDM which is connected to the first WDM and divides or mixes the first wavelength and the second wavelength to allow them travel through a predetermined path;
   a third WDM which is connected to the first WDM and divides a third wavelength and a fourth wavelength from a communication line of the second wavelength; and
   a fourth WDM which is connected to the second WDM and multiplexes or demultiplexes the third wavelength and the fourth wavelength.

2. The optical communication system of claim 1, wherein the first wavelength is 1310 nm, the second wavelength is 1550 nm, the third wavelength is 1510 nm, and the fourth wavelength is 1530 nm.

3. The optical communication system of claim 1, wherein the second WDM divides or mixes the third wavelength and the fourth wavelength.

4. The optical communication system of claim 1, wherein at least two slave units are used, and the second WDM of one slave unit is connected to the first WDM of another slave unit.

5. The optical communication system of claim 1, wherein the third WDM uses a wavelength within a range from 1400 nm to 1700 nm.

6. The optical communication system of claim 1, wherein the fourth WDM is realized as an optical fiber type or micro-lens filter WDM to adjust an isolation ratio.

7. The optical communication system of claim 6, wherein the isolation ratio is in a range from 25 dB to 60 dB.

* * * * *